United States Patent [19]

Pennington

[11] Patent Number: 4,689,209

[45] Date of Patent: Aug. 25, 1987

[54] METHOD FOR PRODUCING NITROUS OXIDE BY REACTING AMMONIA WITH A MOLTEN NITRATE SALT

[75] Inventor: B. Timothy Pennington, Sulphur, La.

[73] Assignee: Olin Corporation, Cheshire, Conn.

[21] Appl. No.: 884,470

[22] Filed: Jul. 11, 1986

[51] Int. Cl.[4] .............................................. C01B 21/22
[52] U.S. Cl. ................................... 423/400; 423/395; 423/579
[58] Field of Search ...................... 423/385, 400, 403

[56] References Cited

U.S. PATENT DOCUMENTS

| | | | |
|---|---|---|---|
| 2,111,277 | 3/1938 | Castner et al. | 423/400 |
| 2,425,582 | 8/1947 | Vingee | 423/400 |
| 4,053,555 | 10/1977 | Bolme | 423/393 |
| 4,082,617 | 4/1978 | Portnoy et al. | 423/400 |
| 4,154,806 | 5/1979 | Szabo et al. | 423/400 |
| 4,203,959 | 5/1980 | Munster | 423/400 |
| 4,225,455 | 9/1980 | Haas | 423/400 |
| 4,285,830 | 8/1981 | Muller | 423/405 |
| 4,376,105 | 3/1983 | Matuda et al. | 423/531 |

OTHER PUBLICATIONS

Suwa, T., A. Matsushima, Y. Suziki and Y. Namina, "Synthesis of Nitrous Oxide by Oxidation of Ammonia," Kohyo Kagaku Zasshi, vol. 64, pp. 1879–1888, 1961.

Chemical Abstract, 95 (22); 189,494a, Czech. Patent CS 186,313, Nov. 30, 1973, J. Mikoda.

Kirk-Othmer's Encyclopedia of Chemical Technology, vol. 2, Third Edition, John Wiley & Sons, p. 527, 1978.

Fouzanfar, H., and D. H. Kerridge, *J. Inorg. Nucl. Chem.*, vol. 40, pp. 1327–1330, Dec. 14, 1977.

*Primary Examiner*—Andrew H. Metz
*Assistant Examiner*—Anthony McFarlane
*Attorney, Agent, or Firm*—Dale Lynn Carlson; Thomas P. O'Day

[57] ABSTRACT

This invention relates generally to a method for producing nitrous oxide, and more specifically, to a method for producing nitrous oxide by reacting ammonia with at least one molten nitrate salt.

20 Claims, No Drawings

METHOD FOR PRODUCING NITROUS OXIDE BY REACTING AMMONIA WITH A MOLTEN NITRATE SALT

FIELD OF THE INVENTION

This invention relates generally to a method for producing nitrous oxide, and more specifically, to a method of producing nitrous oxide by reacting ammonia with at least one molten nitrate salt.

BACKGROUND OF THE INVENTION

Nitrous oxide, which was discovered by Priestly in 1772, was found to have utility as an anesthetic by Davey in 1800. There are at least two conventional commercial methods for its production. By one method, nitrous oxide is produced catalytically from ammonia and air using pelletized Mn and Bi oxides as catalysts, reportedly with an 85 percent conversion of ammonia per single pass at 310°–350° C. This method is disclosed in a Japanese technical publication entitled "SYNTHESIS OF NITROUS OXIDE BY OXIDATION OF AMMONIA," by T. Suwa, A. Matsushima, Y. Suziki and Y. Namina in Kohyo Kagaku Zasshi, Vol. 64, pp 1879–1888, 1961 and also in Czech. Patent CS No. 186,313, issued Nov. 30, 1973 to J. Mikoda, see Chem. Abstract 95(22); 189,494a. The feed gas composition used in this patent was calculated to contain about 2 percent ammonia in 98 percent air and the exit gas concentration of nitrous oxide was about 1 percent. On this basis, the nitrous oxide produced must be separated from a much larger volume of air, resulting in relatively high separation costs. In addition, this catalytic method for producing nitrous oxide from ammonia produces several by-product nitrogen compounds, such as nitric oxide and nitrogen dioxide which necessitate additional separation steps.

The second conventional commercial method for the production of nitrous oxide involves the thermal decomposition of ammonium nitrate at about 170° C. according to the equation below:

This method is described in Kirk-Othmer's Encyclopedia of Chemical Technology, Volume 2, p. 527, (1978). Since ammonium nitrate is considered to be a high explosive, precautions must be taken to minimize the risk of explosion when using this production method, including feeding a concentrated aqueous solution of ammonium nitrate into a reactor at 275° C. However, any dry, molten ammonium nitrate in the system that becomes heated above 250° C. poses a detonation risk according to the equation:

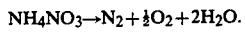

Besides the above two commercial methods for making nitrous oxide, various laboratory methods have also been disclosed. For example, molten nitrate salts have been reported to react with ammonium chloride to produce nitrous oxide, chloride ion, and water according to the equation below:

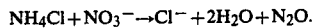

Such a reaction is reported in a technical publication by H. Fouzanfar and D. H. Kerridge in *J. Inorg. Nucl. Chem.*, Vol. 40, pp 1327–1330. This reaction leaves a chloride ion residue in the melt and, with extensive reaction over time, the chloride can build up and actually convert the nitrate melt into a chloride melt. Moreover, the presence of chloride ion can lead to well-known corrosion problems with stainless steels and other conventional materials of reactor construction.

On the basis of the above, an inexpensive, safe method for producing nitrous oxide would be highly desirable. Heretofore, such an inexpensive and safe method involving the use of molten nitrate salts has not been known or suggested to the knowledge of the present inventor.

SUMMARY OF THE INVENTION

In one aspect the present invention relates to a method for producing nitrous oxide by a reaction of ammonia with at least one molten nitrate salt to produce said nitrous oxide.

In another aspect the present invention relates to a continuous method for producing nitrous oxide by the steps of:

(a) reacting ammonia with at least one molten nitrate salt to produce said nitrous oxide, thereby converting at least a portion of said molten nitrate salt to molten nitrite salt, (b) reconverting said molten nitrite salt to molten nitrate salt by reacting said molten nitrite salt with an oxidizing agent, and (c) repeating steps (a) and (b) in a continuous manner.

DETAILED DESCRIPTION OF THE INVENTION

The method of the present invention is particularly advantageous in view of the high degree of specificity associated with this method in terms of nitrous oxide production. Unlike the above-described prior art production technique from ammonia, which generally produces by-products such as nitric oxide and/or nitrogen dioxide, the product streams associated with the method of the present invention generally contain only nitrous oxide, nitrogen, water, and recyclable ammonia, together with small amounts of hydroxide and nitrite. This specificity of nitrous oxide production in accordance with the method of the present invention is particularly important in view of the fact that the primary uses for nitrous oxide are as surgical anesthetics and as propellants for whipped cream in pressurized cannisters. These medical and food-type uses generally require high purity; and, hence, the technical advantage associated with a selective production process is readily apparent inasmuch as it obviates the need for repeated purification steps of the product stream.

Without wishing to be bound to any particular theory, it is believed that the reactions that occur for nitrous oxide production in accordance with the present invention are as follows:

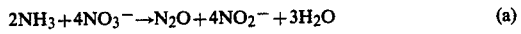

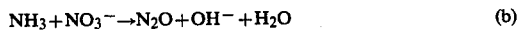

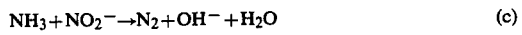

wherein the reaction in accordance with equation (a) generally predominates particularly when the process is carried out within the preferred range within the scope of the present range. Note that the molten nitrate salt is reduced to nitrite during the reaction as shown in equation (a). However, the molten nitrate salt can be readily regenerated by oxidizing the nitrite back to nitrate using an oxidizing agent. For example, air or another oxygen-containing gas, or dilute nitric acid, or mixtures thereof, can be sparged through the molten salt to effect this oxidation. The use of air is preferred since it is the least expensive oxidizing agent. By virtue of the regeneration of nitrate, a continuous process for the production of nitrous oxide in accordance with the present invention can be maintained.

In accordance with the method of the present invention, the molten nitrate salt is generally maintained at a temperature sufficient to keep this salt in a molten condition. Thus, the required temperature will depend upon the melting point of the specific molten nitrate salt or mixture of molten nitrate salts selected. For example, some molten nitrate salt mixtures containing lithium nitrate can be in a molten state at a temperature as low as about 150° C. or lower, whereas other molten nitrate salts, such as cesium nitrate, can require a temperature of as high as about 500° C. or higher in order to maintain a molten state. Thus, a suitable operating temperature for the method of the present invention is selected based upon the melting point of the molten salt selected, and is generally between about 150° C. and about 500° C., preferably between about 150° C. and about 490° C., more preferably between about 290° C. and about 400° C. This latter temperature range has been found to give a good conversion rate to the desired nitrous oxide product.

In a preferred embodiment of the present invention, a mixture of potassium and sodium molten nitrate salts is employed comprising between about 20 and about 80 weight percent sodium nitrate, preferably between about 45 and about 65 weight percent of sodium nitrate based upon the total amount of sodium nitrate and potassium nitrate in the molten salt mixture.

The process of the present invention is suitably carried out at atmospheric pressure. However, if desired, superatmospheric pressures of up to about 100 atmospheres, preferably between about 1 atmosphere and about 10 atmospheres, more preferably between about 1 atmosphere and about 4 atmospheres, or subatmospheric pressures, can be employed.

As will be illustrated by the examples given below, the product stream of the method of the present invention generally contains nitrous oxide, ammonia, nitrogen, and water. Separation of the nitrous oxide from the ammonia is suitably effected by conventional means, such as by bubbling the product stream through an acidic aqueous bath at atmospheric pressure. Separation of the nitrous oxide from nitrogen is suitably effected by passing the nitrous oxide/nitrogen stream through one or more water baths, under elevated pressure, as is well known in the art. See, for example, Czech. Patent No. 161,502, issued Nov. 15, 1975 to J. Mikoda which discloses a series of two water baths to effect this separation.

The ammonia feed gas can be separately passed into the molten nitrate salt-containing reactor, or the ammonia gas can be fed into the reactor together with an oxygen-containing gas, such as air. If air is used, it can be employed in an amount of up to about 50 volume percent based upon the total volume of ammonia and air in the feed gas. If an air-ammonia feed gas mixture is used, preferably the ammonia will be present in an amount of at least about 75 volume percent based upon the total volume of ammonia and air in the feed gas. Alternatively, the ammonia and the air or other oxygen-containing gas can be fed into the molten nitrate salt-containing reactor in separate gas streams. Among other functions, the oxygen in the oxygen-containing gas serves to increase the oxygen partial pressure in the molten salt, thereby assisting in the reconversion of molten nitrite salt into molten nitrite salt, as described above.

The ammonia-containing feed gas is preferably bubbled into the molten nitrate salt-containing reactor using a sparger. If used, the sparger is preferably positioned in the molten nitrate salt to a sparger exit port depth of between about 2 and about 1000 centimeters, preferably between about 10 and about 200 centimeters, depending upon the size of the reactor utilized and the overall depth of the molten salt in the reactor. Alternatively, the gas can be fed directly into the bottom of the reactor by a feed tube.

The ammonia-containing feed gas is preferably preheated prior to being fed into the reactor, although in the absence of preheat, the molten nitrate salt will rapidly heat the feed gas. If the feed gas is preheated, it preferably enters the reactor at a temperature of between about 100° C. and about 550° C.

The following examples are intended to illustrate, but in no way limit, the scope of the present invention.

EXAMPLE 1

Production of Nitrous Oxide by the Method of the Present Invention at a Reaction Temperature of 510° C.

A 2 Kg molten salt mixture consisting of 60 percent by weight of sodium nitrate and 40 percent by weight of potassium nitrate was heated to and maintained at 510° C. in a two-liter stainless steel reaction vessel equipped with a sparger tube which was immersed into the salt at a depth of 10 cm. Pure gaseous ammonia was sparged through the molten salt mixture at a rate of about 500 cc/min for one hour. The reactor was not pressurized and gas flowed through the reactor at essentially atmospheric pressure and exited through a vent line containing a trap for condensible substances and a gas sample cylinder in line after the trap. Analysis of the trap condensate showed it to contain ammonia dissolved in water. Analysis of the product gas stream by gas cell infrared spectroscopy showed it to contain nitrous oxide ($N_2O$) with the remainder being ammonia. Quantitative analysis for $N_2O$ in this gas stream showed it to contain about 5 volume percent nitrous oxide. There were no infrared bands present attributable to the likely by-products, namely nitric oxide and nitrogen dioxide.

EXAMPLE 2

Production of Nitrous Oxide by the Method of the Present Invention at a Reaction Temperature of 450° C.

The experiment described in EXAMPLE 1 was repeated using the same reactor and a fresh molten salt mixture of identical composition, except that the salt temperature in the reactor was lowered to 450° C. The sparger was again immersed to a depth of 10 cm in the salt. Ammonia was again sparged through the molten nitrate salt mixture at a flow rate of about 500 cc/min for one hour. The amount of nitrous oxide in the exit gas sample cylinder was about 1 percent as determined by infrared methods, with the remainder being unreacted ammonia.

A comparison of the nitrous oxide yield from this example (1 percent) as compared to the yield obtained in EXAMPLE 1 above shows that the higher reaction temperature of 510° C. of EXAMPLE 1 provides a higher product yield. On this basis, such a higher reaction temperature is preferred.

EXAMPLE 3

Production of Nitrous Oxide by the Method of the Present Invention at a Reaction Temperature of 450° C. and an Ammonia Sparger Rate of 1,000 cc/min Following the procedure of EXAMPLE 1, the reactor was charged with fresh reagent grade sodium nitrate and potassium nitrate containing less than 100 ppm nitrite or oxide/hydroxide, and the salt mixture was heated to 510° C. Ammonia at a flow rate of 1000 cc/min was sparged through the melt as in EXAMPLE 1 for one hour. At the end of this time, the salt was analyzed and found to contain 25,000 ppm nitrite and 1000 ppm hydroxide ion. The exit gas contained about 5 percent nitrous oxide in ammonia.

EXAMPLE 4

Production of Nitrous Oxide by the Method of the Present Invention in a Larger Reactor Using an Ammonium/Nitrogen Sparging Gas.

In this Example, a 10 liter reactor with a sparger positioned at a depth of 51 cm in the molten salt was used. Ten Kg of a salt composition identical to that employed in EXAMPLE 1 was used at a molten salt temperature of 455° C. in the reactor. The molten salt in the reactor was stirred mechanically while a gas mixture of 950 cc/min ammonia and 250 cc/min of nitrogen were sparged through the salt at ambient pressure for 30 minutes. This gas mixture had been preheated to 225° C. just before being fed into the molten salt reactor. At the end of the reaction, the exit trap, cooled with dry ice-isopropanol, was found to contain 36 grams of a water solution containing 1.5 percent (0.03 moles) of ammonia. An exit gas sample found to contain about 54 volume percent of nitrous oxide and 2 volume percent of unreacted ammonia. The remainder of the exit gas included about 44 volume percent of nitrogen. Total unreacted ammonia in the gas was 0.02 moles. Total unreacted ammonia in gas and liquid was 0.05 moles versus 1.27 total moles of ammonia in the feed gas or 96 percent conversion of ammonia.

EXAMPLE 5

Production of Nitrous Oxide by the Method of the Present Invention in a Larger Reactor Using an Ammonium/Air Sparging Gas The procedure of EXAMPLE 4 was duplicated except that 250 cc of air instead of nitrogen was fed in with ammonia. The dry ice-isopropanol trap was found to contain 36 grams of a water solution containing about 1 percent ammonia or 0.02 moles of ammonia total. The exit gas sample was found to contain aobut 0.4 percent ammonia or 0.004 moles ammonia total. The percent conversion of ammonia was 100 (0.024/1.27 total ammonia fed in X100) or 98 percent. Gas chromatographic, infrared, and gas chromatography/mass spectrometry methods detected nitrous oxide ($N_2O$) and ammonia as present in the exit gases, but nitric oxide and nitrogen dioxide were not found by any of these methods.

EXAMPLE 6

Production of Nitrous Oxide by the Method of the Present Invention in a Larger Reactor Using an Ammonia/Nitrogen Sparging Gas and Using a Reactor Temperature of 400° C.

The procedure of EXAMPLE 4 was duplicated except that the molten salt temperature was set at 400° C. Ammonia was fed in as in EXAMPLE 4 along with 250 cc/min of nitrogen. After a 30 minute run, the dry ice-isopropanol trap was found to contain 6.0 grams of a water solution containing 22 percent ammonia or 0.077 moles. The gas sample bomb upon analysis was found to contain about 34 percent unreacted ammonia and 21 percent nitrous oxide. Total moles of unreacted ammonia was approximately 0.51 moles for a conversion of ammonia to nitrous oxide of 60 percent. The presence of other nitrogen oxides was not detected by gas chromatographic or infrared methods.

What is claimed is:

1. A method for producing nitrous oxide by a reaction of ammonia with at least one molten alkali metal nitrate salt at reaction conditions to produce said nitrous oxide and molten nitrite salt.

2. The method of claim 1 wherein said ammonia is in gaseous form.

3. The method of claim 2 wherein said reaction is carried out by contacting said ammonia with said molten nitrate salt by bubbling said ammonia through a bath of said molten nitrate salt.

4. The method of claim 3 wherein said bubbling of said ammonia is carried out using a sparging tube having an exit port positioned in said bath of said molten nitrate salt.

5. The method of claim 1 wherein said molten nitrate salt is selected from the group consisting of sodium, potassium, lithium and cesium molten nitrate salts and mixtures thereof.

6. The method of claim 1 wherein said reaction is carried out at atmospheric pressure.

7. The method of claim 1 wherein said reaction is carried out in a pressurized reactor at an elevated pressure of no greater than about 100 atmospheres.

8. A continuous method for producing nitrous oxide by the steps of:
   (a) reacting ammonia with at least one molten alkali metal nitrate salt at reaction conditions to produce said nitrous oxide, thereby converting at least a portion of said molten alkali metal nitrate salt to molten nitrite salt,
   (b) reconverting said molten nitrite salt to molten nitrate salt by reacting said molten nitrite salt with an oxidizing agent, and
   (c) repeating steps (a) and (b) in a continuous manner.

9. The method of claim 8 wherein said oxidizing agent is an oxygen-containing gas.

10. The method of claim 8 wherein said ammonia is contacted with said molten nitrate salt by bubbling said ammonia through a bath of said molten nitrate salt.

11. The method of claim 10 wherein said bubbling of said ammonia is carried out using a sparging tube having an exit port positioned in said bath of said molten nitrate salt.

12. The method of claim 8 wherein said molten nitrate salt is selected from the group consisting of sodium, potassium, lithium and cesium nolten nitrate salts, and mixtures thereof.

13. The method of claim 8 wherein step (a) is carried out at atmospheric pressure.

14. The method of claim 8 wherein step (a) is carried out in a pressurized reactor at an elevated pressure of no greater than about 100 atmospheres.

15. The method of claim 8 wherein step (a) is effected in the presence of an oxygen-containing gas.

16. The method of claim 15 wherein said oxygen-containing gas is air.

17. The method of claim 8 wherein said ammonia is provided in the form of a gaseous ammonia-in-air mixture.

18. The method of claim 17 wherein said gaseous ammonia-and-air mixture comprises between about 20 and about 80 volume percent ammonia based upon the total volume of ammonia plus air in said mixture.

19. The method of claim 1 wherein said molten nitrate salt comprises a mixture of molten sodium nitrate and molten potassium nitrate.

20. The method of claim 8 wherein said molten nitrate salt comprises a mixture of molten sodium nitrate and molten potassium nitrate.

* * * * *